United States Patent
David et al.

(10) Patent No.: US 7,111,869 B2
(45) Date of Patent: Sep. 26, 2006

(54) APPARATUS AND METHOD FOR CONTROLLING AN OCCUPANT PROTECTION SYSTEM IN RESPONSE TO DETERMINED PASSENGER COMPARTMENT OCCUPANCY INFORMATION

(75) Inventors: Raymond J. David, Dearborn Heights, MI (US); Robert Dziadula, Farmington Hills, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 145 days.

(21) Appl. No.: 10/624,400

(22) Filed: Jul. 22, 2003

(65) Prior Publication Data

US 2005/0017486 A1 Jan. 27, 2005

(51) Int. Cl.
*B60R 21/32* (2006.01)
(52) U.S. Cl. .................. 280/735; 701/45; 382/103
(58) Field of Classification Search .............. 280/735; 701/45, 47, 49; 382/103, 104; 340/438
See application file for complete search history.

(56) References Cited

U.S. PATENT DOCUMENTS

| | | | | |
|---|---|---|---|---|
| 5,983,147 A | * | 11/1999 | Krumm | 701/45 |
| 6,459,974 B1 | * | 10/2002 | Baloch et al. | 701/45 |
| 6,662,093 B1 | * | 12/2003 | Farmer | 701/45 |
| 6,772,057 B1 | * | 8/2004 | Breed et al. | 701/45 |
| 6,775,606 B1 | | 8/2004 | Ertl et al. | |
| 6,810,133 B1 | * | 10/2004 | Khairallah et al. | 382/104 |
| 6,810,135 B1 | * | 10/2004 | Berenz et al. | 382/118 |
| 2002/0169532 A1 | * | 11/2002 | Zhang | 701/45 |
| 2003/0040859 A1 | | 2/2003 | Farmer | |
| 2004/0125992 A1 | * | 7/2004 | Aoki et al. | 382/118 |
| 2004/0206904 A1 | * | 10/2004 | Djordjevic | 250/330 |

* cited by examiner

*Primary Examiner*—David R. Dunn
(74) *Attorney, Agent, or Firm*—Tarolli, Sundheim, Covell & Tummino L.L.P.

(57) ABSTRACT

An apparatus and method for controlling an actuatable occupant protection system (40) in a passenger compartment (12) of a vehicle (10) includes a camera (72) configured for obtaining an image of a viewable field (78) within the passenger compartment (12) of the vehicle (10). At least one pattern (84, 86) is associated with vehicle structures (22, 24, 26) located within the viewable field (78). The portions of the obtained image associated with vehicle structures (22, 24, 26) having the pattern (84, 86) are removed from the image so as to obtain information regarding occupancy of the viewable field (78). The actuatable occupant protection system (40) is controlled in response to the obtained occupancy information.

17 Claims, 2 Drawing Sheets

APPARATUS AND METHOD FOR CONTROLLING AN OCCUPANT PROTECTION SYSTEM IN RESPONSE TO DETERMINED PASSENGER COMPARTMENT OCCUPANCY INFORMATION

TECHNICAL FIELD

The present invention relates to an apparatus and a method for controlling an actuatable occupant protection system of a vehicle. More particularly, the present invention relates to an apparatus and a method for controlling an actuatable occupant protection system of a vehicle in response to determined information regarding occupancy of the passenger compartment of the vehicle.

BACKGROUND OF THE INVENTION

Vehicle occupant detection systems are useful in determining a position and a classification of an occupant of a vehicle. Actuation of an air bag assembly may be controlled in response to the determined position and classification of the occupant.

A significant challenge to using an image system for determining the position and the classification of an occupant of a vehicle is differentiating the occupant from the background objects of the vehicle. If the background objects of the vehicle are confused with the occupant, the potential for incorrectly determining the position and the classification of the occupant increases significantly.

U.S. Pat. No. 5,531,472 includes a system for determining the location of an occupant of a vehicle. The system must be programmed prior to use in determining the location of the occupant. To program the system, a background image is taken for every combination of seat position and seat inclination available for a seat within the passenger compartment of the vehicle. The background images are stored in a memory. During the process of locating the occupant, the seat position and seat inclination are sensed and the background image for the particular combination of seat position and seat inclination is obtained from memory. An image of the passenger compartment of the vehicle is obtained and the background image associated with the particular combination of seat position and seat inclination is subtracted from the newly obtained image to remove background objects from the newly obtained image. The location of the occupant is then determined from the remaining portions of the image.

SUMMARY OF THE INVENTION

In accordance with one exemplary embodiment of the present invention, an apparatus is provided for controlling an actuatable occupant protection system in a passenger compartment of a vehicle. The apparatus comprises a camera configured for obtaining an image of a viewable field within the passenger compartment of the vehicle. A pattern is associated with vehicle structures located within the viewable field. The apparatus also includes means for removing portions of the obtained image associated with vehicle structures having the pattern so as to obtain information regarding occupancy within the viewable field. The apparatus still further comprises means responsive to the obtained occupancy information for controlling the actuatable occupant protection system.

According to another exemplary embodiment of the present invention, an apparatus is provided for controlling an actuatable occupant protection system in a passenger compartment of a vehicle. The apparatus comprises a dye having low near-infrared reflective properties. The dye is associated with vehicle structures located within a viewable field within the passenger compartment of the vehicle. A camera is configured for obtaining a near-infrared image of the viewable field. The apparatus also comprises means responsive to the near-infrared image for controlling the actuatable occupant protection system.

According to still another exemplary embodiment of the present invention, a method is provided for controlling an actuatable occupant protection system in a passenger compartment of a vehicle. The method includes the steps of imaging of a viewable field within the passenger compartment of the vehicle, associating a pattern with vehicle structures located within the viewable field, subtracting portions of the obtained image associated with vehicle structures having the pattern so as to obtain information regarding occupancy of the viewable field, and controlling the actuatable occupant protection system in response to the obtained occupancy information.

In accordance with yet another exemplary embodiment of the present invention, a method is provided for controlling an actuatable occupant protection system in a passenger compartment of a vehicle. The method includes the steps of associating a dye having low near-infrared reflective properties with vehicle structures located within a viewable field within the passenger compartment of the vehicle, obtaining a near-infrared image of the viewable field, and controlling the actuatable occupant protection system in response to the near-infrared image.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

Figure 1:
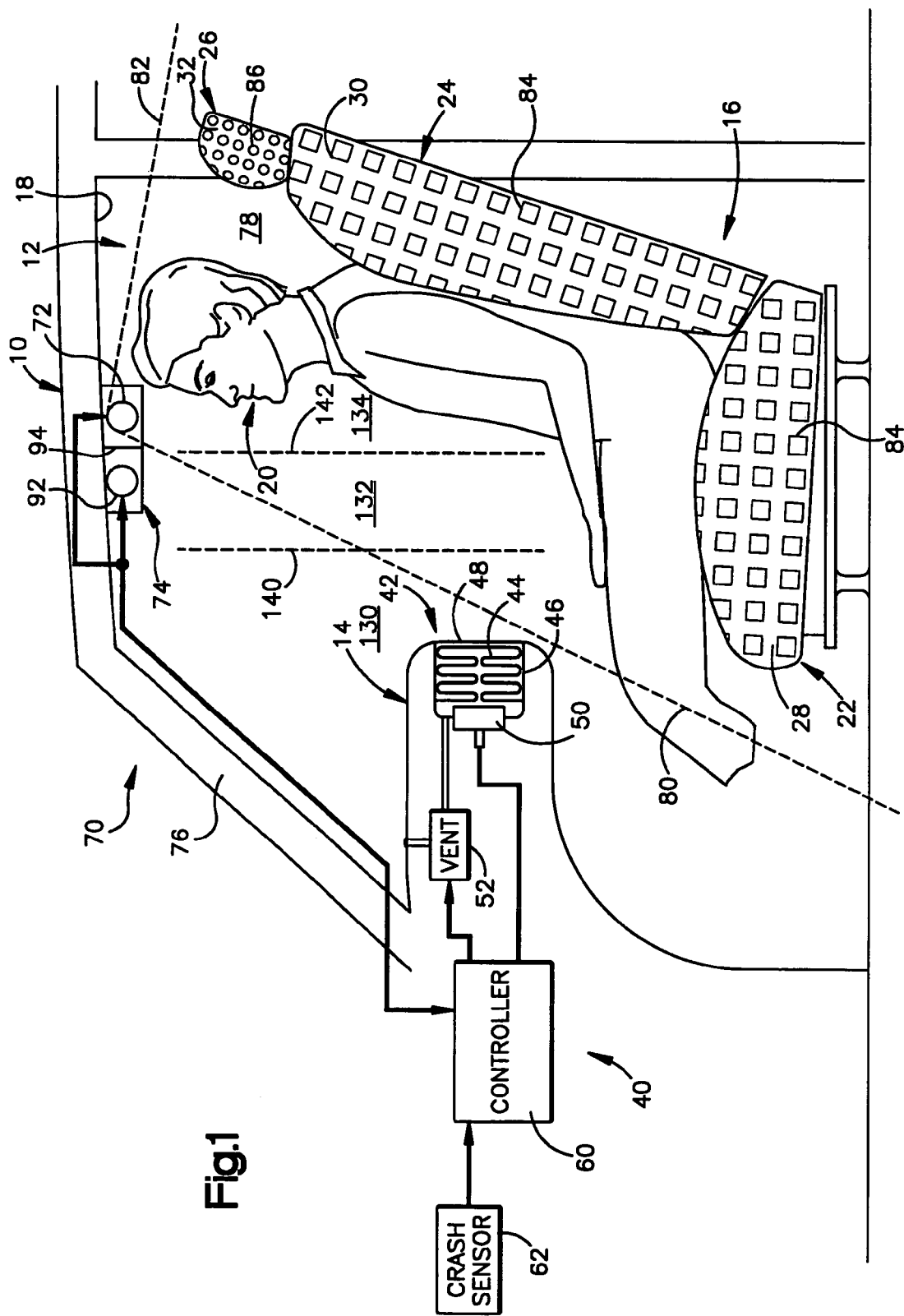
FIG. 1 is a schematic illustration of a vehicle including an actuatable occupant protection system and an apparatus, constructed in accordance with an exemplary embodiment of the present invention, for controlling the actuatable occupant protection system.

FIG. 1 illustrates a vehicle 10 having a passenger compartment 12. The passenger compartment 12 includes an instrument panel 14 and a seat 16. A headliner 18 defines an upper boundary of the passenger compartment 12. FIG. 1 illustrates an occupant 20 located in the passenger compartment 12 of the vehicle 10 and seated on the seat 16.

The seat 16 includes a cushion portion 22, a backrest portion 24, and a headrest portion 26. The cushion portion 22 includes a cover 28 upon which the occupant 20 sits. The backrest portion 24 extends upwardly from the cushion portion 22. The backrest portion 24 of the seat 10 includes a cover 30. In FIG. 1, the rear of the occupant's torso is leaning against the cover 30 of the backrest portion 24 of the seat 16. A headrest portion 26 of the seat 16 extends upwardly from the backrest portion 24. The headrest portion 26 also includes a cover 32.

The vehicle 10 also includes an actuatable occupant protection system 40. The occupant protection system 40 in the exemplary embodiment shown in FIG. 1 includes an air bag assembly 42. Alternatively, the occupant protection system 40 may include a pretensioner, an actuatable knee bag, an actuatable knee bolster, a side curtain, or any other type of actuatable occupant protection system.

The air bag assembly 42 includes an air bag 44 that is located in an air bag housing 46. The air bag housing 46 is mounted in the instrument panel 14 of the vehicle 10. A deployment door 48 of the air bag assembly 42 covers a deployment opening in the instrument panel 14. The air bag assembly 42 also includes an actuatable inflator 50. When actuated, the inflator 50 provides inflation fluid to the air bag 44. In response to receiving the inflation fluid, the air bag 44 inflates through the deployment opening in the instrument panel 14 and into the passenger compartment 12 of the vehicle 10 for helping to protect the occupant 20 of the vehicle.

The occupant protection system 40 also includes an inflation-varying device for varying the inflated condition of the air bag 44. In the exemplary embodiment of FIG. 1, the inflation-varying device is an electrically controlled vent device 52. The vent device 52 includes a valve that is in fluid communication with the air bag 44 and is operable for releasing inflation fluid from the air bag. Alternative inflation-varying devices may include, but are not limited to, multiple inflator assemblies, a dual-stage inflator assembly, and releasable tethers.

The occupant protection system 40 also includes a controller 60. Preferably, the controller 60 is a microcomputer. The controller 60 is operatively connected to a crash sensor 62 and receives signals indicative of a vehicle crash condition from the crash sensor. The crash sensor 62 may include an inertia switch, a crush zone sensor, an accelerometer, or any other type of suitable crash sensor for providing signals indicative of a vehicle crash condition. The controller 60 analyzes the signals from the crash sensor 62 using an algorithm and determines whether a deployment crash condition is occurring. A deployment crash condition is a crash condition in which deployment of the air bag 44 is desirable for helping to protect the occupant 20 of the vehicle 10. In response to the occurrence of a deployment crash condition and other sensed occupancy conditions, the controller 60 controls actuation of the air bag assembly 42 and controls the vent device 52, as is discussed in further detail below.

The vehicle 10 also includes an imaging system 70. The imaging system 70 determines whether the passenger compartment 12 of the vehicle 10 is occupied and, when occupied, locates, classifies, and tracks the occupancy of the passenger compartment. The imaging system 70 includes a camera 72 for obtaining an image of the passenger compartment 12 of the vehicle 10.

In the exemplary embodiment shown in FIG. 1, the camera 72 is located in a housing 74 that is mounted to the headliner 18 of the vehicle 10. The camera 72 may have alternative locations in the vehicle 10 such as, for example, on the instrument panel 14 or the A-pillar 76 of the vehicle. The camera 72 is positioned so as to have a viewable field 78 within the passenger compartment 12 of the vehicle 10. In FIG. 1, the viewable field 78 includes the area of the passenger compartment 12 located between dashed lines 80 and 82. The camera 72 of the imaging system 70 is configured to obtain an image of the viewable field 78.

The camera 72 is a near-infrared camera, i.e., designed for imaging in the near-infrared spectrum of light (light having a wavelength of approximately 775 nanometers to 1400 nanometers). Preferably, the camera 72 is a complimentary metal-oxide semiconductor ("CMOS"), near-infrared camera. Alternative types of near-infrared cameras, such as charge-coupled device ("CCD") cameras, may be used. In an exemplary embodiment of the invention, the camera 72 is preferably configured for obtaining a near-infrared image of the viewable field 78 at a wavelength of approximately 900 nanometers.

The imaging system 70 also includes one or more patterns that are associated with background objects within the viewable field 78 of the camera 72. Background objects are structures of the vehicle 10 that are not helpful in determining the location, classification, and tracking of an occupant 20 of the vehicle. The background objects may vary depending upon the location of the camera 72, the viewable field 78, and the interior structure of the vehicle. In the exemplary embodiment shown in FIG. 1, the seat 16 is a background object. Other vehicle structures that may form background objects include, but are not limited to, the instrument panel 14 of the vehicle 10, the pillars of the vehicle, e.g., the A-pillar 76, portions of a door (not shown), and/or center console (not shown) of the vehicle.

In the exemplary embodiment shown in FIG. 1, a first pattern 84 is associated with the covers 28 and 30 of the cushion portion 22 and the backrest portion 24 of the seat 10, respectively, and a second pattern 86 is associated with the cover 32 of the headrest portion 26 of the seat. The first pattern 84 includes a plurality of squares. The second pattern 86 includes a plurality of circles. The first and second patterns 84 and 86 may be painted onto an exterior surface of the covers 28, 30, and 32. Alternatively, the first and second patterns 84 and 86 may be formed as part of the material of the covers 28, 30, and 32. Additionally, other shapes and patterns may be used, for example, checkerboard patterns, dots, etc. Also, patterns may be placed on or associated with any vehicle structure considered as a background object. Each background object can have an associated pattern different from that of other background objects.

The first and second patterns 84 and 86 are formed from a near-infrared dye and are not visible by humans. As a result, the first and second patterns 84 and 86 do not change the aesthetics of the seat 16. In an exemplary embodiment, the dye used for forming the first and second patterns 84 and 86 is a metal complex near-infrared dye, such as product numbers SDA5575 and SDA9018 available from H.W. Sands Corp. of Juniper, Fla. The metal complex near-infrared dye is formulated so as to not breakdown when exposed to excessive heat and sunlight, as may be expected over the life of a vehicle seat 16. The metal complex near-infrared dye generally fluoresces at a wavelength that is approximately twenty nanometers longer than a wavelength of illumination.

Figure 2:
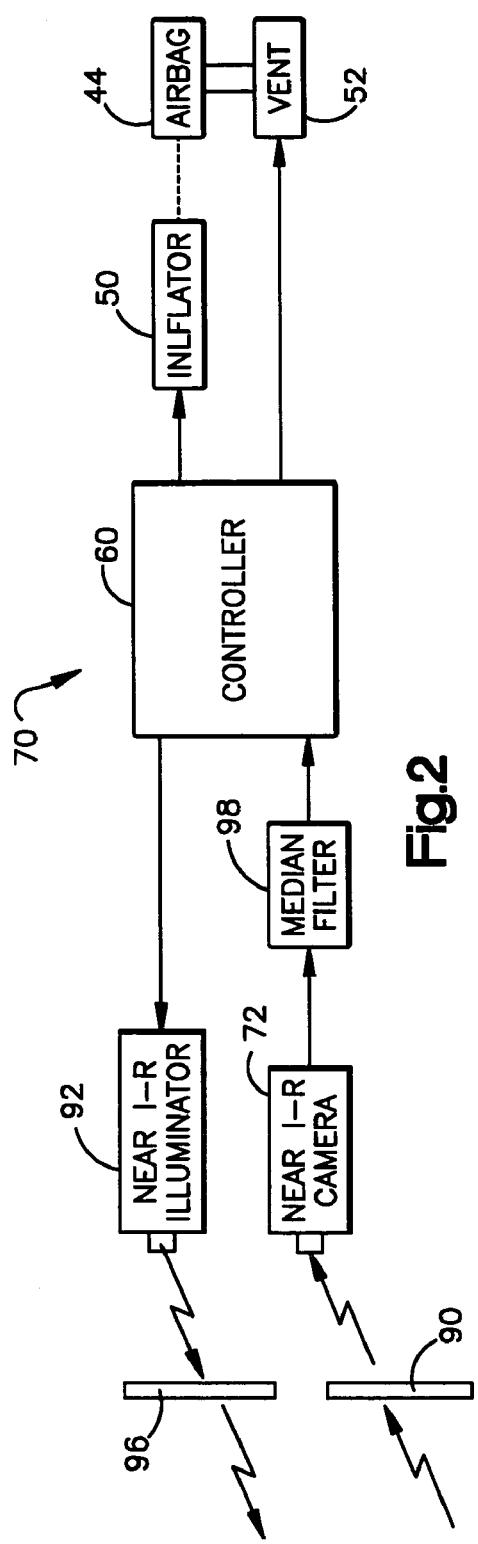
FIG. 2 is a schematic block diagram of a portion of the apparatus of FIG. 1.

As illustrated in FIG. 2, an optical filter 90 is associated with the camera 72. The optical filter 90 is located between the camera 72 and the passenger compartment 12 of the vehicle 10 and is of a conventional design. The optical filter 90 enables a range of wavelengths of light to pass through the filter and blocks wavelengths of light that are outside the range. In an exemplary embodiment of the present invention, the optical filter 90 preferably enables a range of near-infrared light from approximately 820 to 1000 nanometers to pass through the filter. The optical filter 90 blocks wavelengths of light outside of the 820 to 1000 nanometer range. As a result, the optical filter 90 prevents bright sunlight, which would typically affect the image obtained by the camera 72, from affecting the obtained image. Additional benefits of the optical filter 90 is that the filter hides the camera 72 from view and may be made to blend into the environment upon which the filter is mounted so as to be aesthetically pleasing to occupants of the vehicle 10.

The controller 60 also forms a portion of the imaging system 70. As an alternative to having the controller 60 form a portion of the occupant protection system 40 and a portion of the imaging system 70, two separate controllers in communication with one another may be used.

The camera 72 is operatively connected to the controller 60. The controller 60 actuates the camera 72 to obtain an image of the viewable field 78. The camera 72 provides the obtained image to the controller 60. Preferably, the camera 72 is actuated to obtain an image of the viewable field 78 thirty to fifty times per second. As a result, the controller 60 receives thirty to fifty images or frames per second. In an exemplary embodiment of the invention, the camera 72 obtains an 8-bit, greyscale image of the viewable field 78. Although a greyscale image is preferred, the camera 72 may, alternatively, obtain a color image of the viewable field 78. The camera 72 may also obtain an image other than an 8-bit image.

The imaging system 70 also includes a near-infrared illuminator 92 for illuminating the viewable field 78 with near-infrared light. The near-infrared light from the illuminator 92 is outside of the visible spectrum for humans and is thus, not visible by the occupant 20 of the vehicle 10. In an exemplary embodiment, the near infrared light from the illuminator 92 has a wavelength of approximately 880 nanometers.

FIG. 1 illustrates the near-infrared illuminator 92 located in the housing 74 mounted to the headliner 18 of the vehicle 10. When the illuminator 92 is mounted in the same housing 74 as the camera 72, a partition 94 (FIG. 1) separates the camera 72 and the illuminator 92. The illuminator 92 may, alternatively, be in mounted to the vehicle 10 at a location different from the camera 72, such as on the A-pillar 76 or instrument panel 14.

The illuminator 92 is operatively connected to the controller 60. The controller 60 controls actuation of the illuminator 92 for illuminating the viewable field 78. The controller 60 may actuate the illuminator 92 to illuminate the viewable field 78 for each obtained image gathered by the camera 72 of the imaging system 70. Alternatively, the controller 60 may actuate the illuminator 92 to illuminate the viewable field 78 only when ambient light is below a predefined level, for example, during nighttime use of the imaging system 70. When the illuminator 92 is actuated only when ambient light is below a predefined level, the imaging system 70 may include a light sensor (not shown) for sensing the level of ambient light and providing a signal indicative of the level of ambient light to the controller 60.

An optical filter 96 (FIG. 2) is also associated with the illuminator 92. The optical filter 96 is located between the illuminator 92 and the passenger compartment 12 of the vehicle 10. The optical filter 96 is similar to optical filter 90. The optical filter 96 enables a range of near-infrared light to pass through the filter and blocks wavelengths of light that are outside the range. In an exemplary embodiment of the invention, the optical filter 96 enables a range of near-infrared light from approximately 820 to 1000 nanometers to pass through the filter. The optical filter 96 blocks wavelengths of light outside of the 820 to 1000 nanometer range. Additional benefits of the optical filter 96 is that the filter hides the illuminator 92 from view and may be made to blend into the environment upon which the filter is mounted so as to be aesthetically pleasing to occupants of the vehicle 10.

As stated above, the near-infrared dye from which the first and second patterns 84 and 86 are formed fluoresces at a wavelength that is approximately twenty nanometers longer than the wavelength of illumination. Thus, when the illuminator 92 illuminates the viewable field 78 with near-infrared light having a wavelength of approximately 880 nanometers, the first and second patterns 84 and 86 on the covers 28, 30, and 32 of the cushion portion 22, the backrest portion 24, and the headrest portion 26 of the seat 16 fluoresce at a wavelength of approximately 900 nanometers. Since the camera 72 is configured for obtaining an image of the viewable field 78 at a wavelength of approximately 900 nanometers, the fluorescing first and second patterns 84 and 86 are white in the greyscale image obtained by the camera.

As shown in FIG. 2, the images provided by the camera are input into a median filter 98. The median filter 98 removes speckle noise or pixel noise from the images. The images, after being filtered, are then provided to the controller 60.

Each image provided to the controller 60 includes thousands of pixels. A pixel value, i.e., an intensity value, is associated with each pixel of the obtained image. For an 8-bit image, the pixel value of each pixel ranges from zero to 255. In the greyscale, 8-bit image, a pixel value of zero is indicative of black and a pixel value of 255 is indicative of white. Pixel values between zero and 255 are indicative of shades of gray with lower pixel values being darker than higher pixel values being lighter.

Figure 3:
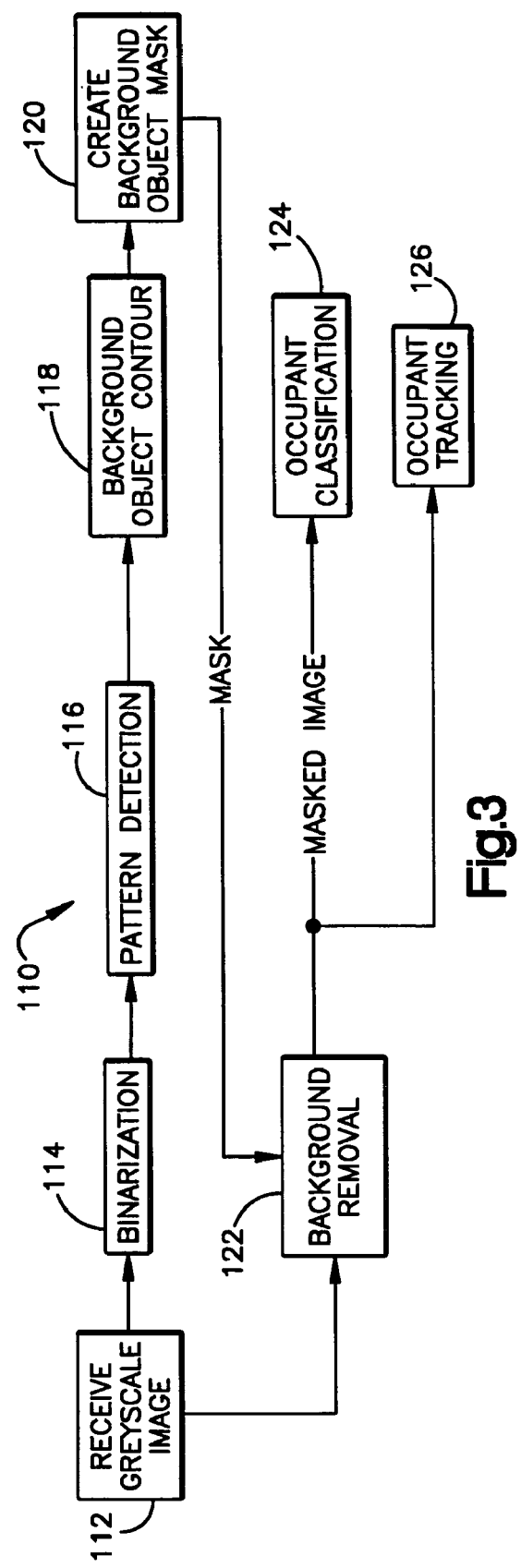
FIG. 3 is a flow chart illustrating an exemplary embodiment of a control process in accordance with the present invention.

FIG. 3 is a flow chart showing a control process 110 performed by the controller 60 in accordance with an exemplary embodiment of the present invention. The control process 110 is discussed with regard to the 8-bit, greyscale image obtained by the camera 72. The control process 110 begins at step 112 with the controller 60 receiving the greyscale image. At step 114, binarization of the received image is performed. During binarization, the pixel value associated with each pixel of the received image is compared to a threshold value. In an exemplary embodiment of the present invention, the threshold value is set to 180. When the pixel value associated with a pixel exceeds the threshold value, the pixel is assigned a value of one, i.e, white. When the pixel value associated with the pixel is equal to or less than the threshold value, the pixel is assigned a value of zero, i.e, black. During binarization at step 114, all of the pixels of the received image are assigned a value of either one or zero. Binararization (Step 114) produces a binary image.

Since the near-infrared dyes forming the first and second patterns 84 and 86 fluoresce at approximately 900 nanometers when illuminated at 880 nanometers, the pixels in the received image that are associated with the first and second patterns 84 and 86 will have pixel values that exceed the threshold value during binarization at step 114. As a result, the pixels associated with the first and second patterns 84 and 86 will have values of one, i.e., white, in the binary image. Pixels that are not associated with the first and second patterns 84 and 86 may also have values of one in the binary image. For example, the occupant 20 of the vehicle 10 may be wearing clothing that is highly reflective and results in values of one in the binary image.

The control process 110 proceeds from step 114 to step 116. At step 116, a pattern detection process is performed on the binary image. By detecting the first pattern 84 in the binary image, the location of the cushion portion 22 and the backrest portion 24 in the binary image is determined. Likewise, by detecting the second pattern 86 in the binary image, the location of the headrest portion 26 of the seat 16 in the binary image is determined. During the pattern detection process at step 116, the controller 60 analyzes the binary image looking for the first pattern 84, i.e., squares, and for the second pattern 86, i.e., circles.

The pattern detection process at step 116 may be performing using any one of a number of pattern detection techniques. For example, the first pattern 84 may be detected using a technique known as "line matching." During "line matching", the controller 60 first analyzes the binary image for line segments. After the controller 60 determines the locations in the binary image of the line segments, the controller 60 analyzes the line segments to determine if two line segments meet one another at a specified angle, such as ninety degrees. The "line matching" technique determines that a square, or a portion of a square, of the first pattern 84 is present when two line segments meet one another at ninety degrees.

Another pattern detection technique that may be used for detecting the first and second patterns 84 and 86 includes correlation to a model pattern. For example, the controller 60 may include a memory (not shown) in which is stored a model circle indicative of the second pattern 86. The controller 60 analyzes the binary image attempting to correlate patterns in the binary image to the model circle. When the controller 60 makes a correlation to the model circle, the controller 60 determines that a circle of the second pattern 86 is present in the binary image.

The control process 110 proceeds from step 116 to step 118. At step 118, the controller 60 determines a contour or outline of the background objects in the binary image. In the exemplary embodiment, the background objects in the binary image include portions of the cushion portion 22, the backrest portion 24, and the headrest portion 26 of the seat 16 upon which the first or second patterns 84 and 86 were detected. At step 118, the controller 60 compiles like patterns and determines an outline of the compiled like patterns. For example, the controller 60 compiles all of the squares of the first pattern 84 that are detected in the binary image. The controller 60 then outlines the area of the binary image having the detected squares. The outlined areas of detected first and second patterns 84 and 86 form the background object contours in the binary image.

The control process 110 then proceeds to step 120 in which the controller 60 creates a background object mask. To form the background object mask, the controller 60 first determines which pixels of the binary image are located within the background object contours. Then, the controller 60 assigns a value of zero, i.e., black, to all of the pixels within the background object contours and assigns a value of one, i.e., white, to all pixels outside of the background object contours. Thus, to create the background object mask, the controller 60 fills in the background object contour determined at step 118 of the binary image with black and makes the remainder of the binary image white.

From step 120, the control process 110 proceeds to step 122. At step 122, the background objects are removed from the greyscale image that was received at step 112. At step 122, the controller 60 performs a multiplication operation using the pixel value associated with the pixels of the received greyscale image and the binary value associated with the same pixel in the background object mask. For example, when the pixel value of a pixel in the background object mask is a one, the result of the multiplication operation with the pixel value of the same pixel in the received greyscale image remains the pixel value of the pixel in the received greyscale image. When the pixel value of a pixel in the background object mask is zero, the result of the multiplication operation with the pixel value of the same pixel in the received greyscale image is zero. The result of step 122 is a masked image in which the background objects are removed.

In an alternative to steps 114 and 122 of the control process, during binarization at step 114, the pixels having a pixel value above the threshold remain at that pixel value and the pixels having a pixel value equal to or below the threshold are set to zero. At step 122, a comparison operation takes place between the pixel value of a pixel of the background object mask and the same pixel of the received greyscale image from step 112. The comparison operation is arranged so that, if the pixel has the same pixel value in the background object mask and in the received greyscale image, the pixel remains at the pixel value. If the pixel values in the background object mask and in the received greyscale image differ, the pixel is determined to be associated with the background object and the pixel value of the pixel is set to zero.

The control process 110 shown in FIG. 3 proceeds from step 122 to step 124. In step 124, the masked image is analyzed to determine if the viewable field 78 of the passenger compartment 12 is occupied and, if occupied, to classify the occupancy of the viewable field 78. Occupant classification techniques are used to classify the occupancy of the viewable field 78. Such techniques may include the use of neural networks or support vector machines. Classifications for the occupancy of the viewable field 78 include, but are not limited to, adult, forward facing child, rearward facing child seat, and inanimate object.

The masked image is also analyzed at step 126 to determine the location of the occupant 20 relative to the deployment door 48 and, if the occupant is moving, tracks the position of the occupant in the passenger compartment 12 of the vehicle 10. Since the vehicle 10 dimensions are known, the masked image can be used to determine the position of the occupant 20 relative to the deployment door 48. The occupant position is stored in a memory (not shown) of the controller 60. Since the camera 72 is actuated to obtain between thirty and fifty frames per second, the occupant position in the next frame is determined and the velocity of the occupant 20 is calculated using the change in position and the time between frames.

The controller 60 is responsive to the occupant classification information from step 124 and the occupant location and tracking information from step 126 for controlling actuation of the occupant protection system 40. Given the occupant position and the occupant velocity, the controller 60 predicts future positions of the occupant 20. For example, if the controller 60 determines that the occupant 20 is moving toward the deployment door 48, the controller 60 predicts when the occupant 20 will enter particular deployment zones within the passenger compartment 12 of the vehicle 10.

FIG. 1 illustrates the passenger compartment 12 of the vehicle 10 including a non-deployment zone 130, a low deployment zone 132, and a full deployment zone 134. The non-deployment zone 130 is located to the left of line 140 as viewed in FIG. 1. The low deployment zone 132 is located between line 140 and line 142 in FIG. 1. The full deployment zone 134 is located to the right of line 142 as viewed in FIG. 1. The controller 60 controls actuation of the air bag assembly 42 in response to the occupant classification and the predicted occupant position. For example, when the occupant 20 is located in the full deployment zone 134 and is predicted to be in the full deployment zone 134 at a future time in which the air bag 44 is fully inflated, the controller 60 actuate the inflator 50 and closes the vent device 52 to fully inflate the air bag 44 when a deployment crash condition occurs. When the occupant 20 is predicted to be in the low deployment zone 132 at a future time in which the air bag 44 is partially inflated, the controller 60 actuates the inflator 50 and opens the vent device 52 to partially inflate the air bag 44 when a deployment crash condition occurs. When the occupant 20 is located in the non-deployment zone 130 and is predicted to be in the non-deployment zone 130 at the future time in which the air bag 44 is partially inflated, the controller 60 does not actuate the inflator 50 when a deployment crash condition occurs. Thus, the controller 60 is responsive the occupancy information from steps 124 and 126 for controlling the occupant protection system 40.

In accordance with another exemplary embodiment of the invention, a dye having low near-infrared reflective properties is associated with background objects located within the viewable field 78 within the passenger compartment 12 of the vehicle 10. For example, the low near-infrared reflective dye is applied to the cushion portion 22, the backrest portion 24, and the headrest portion 26 of the seat 16. A camera 72 is configured for obtaining a near-infrared image of the viewable field. Since the background objects include the low near-infrared reflective dye, the background objects are black on the obtained image. The obtained image is analyzed in a manner similar to those described with regard to steps 124 and 126 in FIG. 3, so that an occupant 20 located within the viewable field 78 within the passenger compartment 12 of the vehicle 10 is classified and tracked. The actuatable occupant protection system 40 is controlled in response to the occupant classification, location, and tracking information.

From the above description of the invention, those skilled in the art will perceive improvements, changes and modifications. A three-dimensional image may be obtaining by adding a stereo camera and correlating the images from two cameras to determine the third dimension. Such improvements, changes and modifications within the skill of the art are intended to be covered by the appended claims.

What is claimed is:

1. An apparatus for controlling an actuatable occupant protection system in a passenger compartment of a vehicle, the apparatus comprising:
 a camera configured for obtaining an image of a viewable field within the passenger compartment of the vehicle;
 at least one pattern located on vehicle structures located within the viewable field;
 means for detecting the pattern in the obtained image;
 means for removing portions of the obtained image associated with vehicle structures having the pattern so as to obtain information regarding occupancy within the viewable field; and
 means responsive to the obtained occupancy information for controlling the actuatable occupant protection system,
 wherein the means for detecting the pattern in the obtained image includes means for forming a binary image from the obtained image, the means for forming the binary image including means for comparing pixel values of the obtained image with a threshold value and providing a binary zero when a respective pixel value fails to exceed the threshold value.

2. The apparatus of claim 1 wherein a first pattern is located on a first vehicle structure and a second pattern, different from the first pattern, is located on a second vehicle structure.

3. The apparatus of claim 1 wherein the means for comparing pixel values provides a binary one when the respective pixel value exceeds the threshold value.

4. The apparatus of claim 1 further including means for creating an image mask of the vehicle structures having the pattern.

5. The apparatus of claim 4 wherein the means for removing portions of the obtained image associated with vehicle structures includes means for applying the image mask to the obtained image.

6. The apparatus of claim 1 wherein the at least one pattern is formed from a dye that is adapted to fluoresce at a near-infrared wavelength of light, the camera being a near-infrared camera that is adapted to obtain an image at the fluorescing near-infrared wavelength.

7. The apparatus of claim 6 further including an illuminator adapted for illuminating the viewable field within the passenger compartment with near-infrared light.

8. The apparatus of claim 1 wherein the actuatable occupant protection system includes an inflatable air bag, the means responsive to obtained occupancy information including an inflation-varying device for varying inflation of the inflatable air bag.

9. The apparatus of claim 1 wherein the pattern fluoresces when illuminated by light having a wavelength within a predetermined range.

10. The apparatus of claim 9 wherein the wavelength within the predetermined range is a near infrared-red wavelength.

11. An apparatus for controlling an actuatable occupant protection system in a passenger compartment of a vehicle, the apparatus comprising:
 a camera configured for obtaining an image of a viewable field within the passenger compartment of the vehicle;
 at least one pattern located on vehicle structures located within the viewable field, the at least one pattern being formed from a dye that is adapted to fluoresce at a near-infrared wavelength of light, the camera being a near-infrared camera that is adapted to obtain an image at the fluorescing near-infrared wavelength;
 means for detecting the pattern in the obtained image;
 means for removing portions of the obtained image associated with vehicle structures having the pattern so as to obtain information regarding occupancy within the viewable field;
 means responsive to the obtained occupancy information for controlling the actuatable occupant protection system; and
 an optical filter associated with the camera, the optical filter allowing passage of a predefined range of near-infrared wavelengths of light and preventing passage of wavelengths of light outside of the predefined range.

12. A method of controlling an actuatable occupant protection system in a passenger compartment of a vehicle, the method comprising the steps of:
 obtaining an image of a viewable field within the passenger compartment of the vehicle;
 locating at least one pattern on vehicle structures located within the viewable field;

detecting the pattern in the obtained image;

removing portions of the obtained image associated with vehicle structures having the pattern so as to obtain information regarding occupancy of within the viewable field; and controlling the actuatable occupant protection system in response to the obtained occupancy information;

the step of detecting the pattern in the obtained image further includes the step of forming a binary image from the obtained image by comparing pixel values of the obtained image with a threshold value and providing a binary zero when a respective pixel value fails to exceed the threshold value.

13. The method of claim 12 wherein the step of locating at least one pattern on vehicle structures located within the viewable field includes the steps of locating a first pattern on a first vehicle structure and locating a second pattern, different from the first pattern, on a second vehicle structure.

14. The method of claim 12 further including the step of creating an image mask of the vehicle structures having the pattern.

15. The method of claim 14 wherein the step of removing portions of the obtained image associated with vehicle structures having the pattern further includes the step of applying the image mask to the obtained image.

16. The method of claim 12 further including the step of forming the at least one pattern from a dye that is adapted to fluoresce at a near-infrared wavelength of light and wherein the step of obtaining an image of a viewable field within the passenger compartment of the vehicle includes the step of obtaining the image at the fluorescing near-infrared wavelength.

17. The method of claim 16 further including the step of illuminating the viewable field within the passenger compartment with near-infrared light.

* * * * *